United States Patent
Hohl et al.

(10) Patent No.: US 10,830,038 B2
(45) Date of Patent: Nov. 10, 2020

(54) BOREHOLE COMMUNICATION USING VIBRATION FREQUENCY

(71) Applicants: Andreas Hohl, Hannover (DE); Wojciech Emmerich, Celle (DE)

(72) Inventors: Andreas Hohl, Hannover (DE); Wojciech Emmerich, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/417,856

(22) Filed: May 21, 2019

(65) Prior Publication Data

US 2019/0368342 A1 Dec. 5, 2019

Related U.S. Application Data

(60) Provisional application No. 62/677,212, filed on May 29, 2018.

(51) Int. Cl.
*E21B 47/20* (2012.01)
*H04B 11/00* (2006.01)
*H04B 13/02* (2006.01)

(52) U.S. Cl.
CPC ............ *E21B 47/20* (2020.05); *H04B 11/00* (2013.01); *H04B 13/02* (2013.01)

(58) Field of Classification Search
CPC ....... E21B 47/182; E21B 47/20; H04B 11/00; H04B 13/02
USPC .......................................................... 367/83
See application file for complete search history.

(56) References Cited

U.S. PATENT DOCUMENTS

| | | | |
|---|---|---|---|
| 5,321,981 A | 6/1994 | MacPherson | |
| 5,864,058 A | 1/1999 | Chen et al. | |
| 7,298,285 B2 | 11/2007 | Moriarty | |
| 7,334,651 B2 | 2/2008 | Wu | |
| 8,166,801 B2 | 5/2012 | Sinha | |
| 8,180,614 B2 | 5/2012 | Pabon et al. | |
| 8,511,388 B2 * | 8/2013 | Milne | E21B 33/0355 166/363 |

(Continued)

FOREIGN PATENT DOCUMENTS

WO 2015187027 A1 12/2015

OTHER PUBLICATIONS

Cobern, Martin E.; "Downhole Vibration Monitoring & Control System"; 2004; APS Technology Inc.; Connecticut; Retrieved from the Internet;HTTP://www.osti.gov.scitech/servlets/purl/835135; 61 pages.

(Continued)

*Primary Examiner* — Hirdepal Singh
(74) *Attorney, Agent, or Firm* — Cantor Colburn LLP

(57) ABSTRACT

Communication methods and systems for communicating from a surface location to a downhole component in a borehole in an earth formation are described. The methods and systems include modulating, by a first device at the surface location, a fluid flow through a mud motor according to a predetermined pattern, the mud motor disposed in the borehole, the modulated fluid flow generating a mechanical movement variation pattern of at least a part of the mud motor, detecting, by a second device in the downhole component, the mechanical movement variation pattern, and demodulating the mechanical movement variation pattern to receive a signal that is related to the predetermined pattern.

20 Claims, 5 Drawing Sheets

(56) References Cited

U.S. PATENT DOCUMENTS

| | | | |
|---|---|---|---|
| 8,581,592 B2* | 11/2013 | Bittar | E21B 47/01 |
| | | | 324/338 |
| 8,589,136 B2 | 11/2013 | Ertas et al. | |
| 8,640,791 B2 | 2/2014 | Turner et al. | |
| 8,684,108 B2 | 4/2014 | Turner et al. | |
| 9,022,145 B2 | 5/2015 | Rodney et al. | |
| 9,435,187 B2 | 9/2016 | Hohl et al. | |
| 2010/0195442 A1 | 8/2010 | Reyes et al. | |
| 2010/0245121 A1* | 9/2010 | Reed | E21B 47/18 |
| | | | 340/855.4 |
| 2015/0014058 A1 | 1/2015 | Wassell | |
| 2015/0083492 A1 | 3/2015 | Wassell | |
| 2015/0088468 A1* | 3/2015 | Hohl | E21B 41/00 |
| | | | 703/2 |
| 2016/0108729 A1 | 4/2016 | Li et al. | |
| 2016/0290126 A1* | 10/2016 | Rendusara | E21B 47/12 |
| 2018/0106147 A1* | 4/2018 | Lakings | E21B 49/003 |
| 2018/0340407 A1* | 11/2018 | Wagner | E21B 44/00 |
| 2020/0011146 A1* | 1/2020 | Samuel | E21B 21/08 |

OTHER PUBLICATIONS

CA Office Action for Application No. 3,044,400, dated Apr. 21, 2020, 3 pages.

* cited by examiner

BOREHOLE COMMUNICATION USING VIBRATION FREQUENCY

CROSS REFERENCE TO RELATED APPLICATIONS

This application claims the benefit of an earlier filing date from U.S. Provisional Application Ser. No. 62/677,212, filed May 29, 2018, the entire disclosure of which is incorporated herein by reference.

BACKGROUND

Various types of drill strings are deployed in a borehole for exploration and production of hydrocarbons. A drill string generally includes drill pipe and a bottomhole assembly. The bottomhole assembly includes a drill bit that is rotated from the surface and/or by a downhole drive such as a mud motor. During drilling, communication between downhole components and/or between downhole components and the surface is effected by communication systems such as wired systems (e.g., wired pipe) and mud pulse telemetry.

BRIEF SUMMARY

Communication methods and systems are provided. The systems and methods include modulating, by a first device, a fluid flow through a mud motor according to a predetermined pattern, the mud motor disposed in a borehole in an earth formation, the modulated fluid flow generating a mechanical movement variation pattern of at least a part of the mud motor, estimating, by a second device, the mechanical movement variation pattern, and demodulating the mechanical movement variation pattern to receive a signal that is related to the predetermined pattern.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are systems and methods for communication to and from downhole components. An embodiment of a communication system includes a device or devices configured to control, modulate, alter, or change a vibration or other movement characteristic of a downhole component and generate a vibration or other mechanical movement variation pattern associated with a communication. The communication system also includes a detection device or devices configured to detect the pattern and demodulate or otherwise analyze the pattern to receive a signal corresponding to the pattern. The pattern may represent any type of communication, such as a command, sensor data, status information, etc. Further, disclosed herein are systems and methods for communication that modulate a fluid flow through a mud motor according to a predetermined pattern, with the modulated fluid flow generating a mechanical movement variation pattern of a part of the mud motor.

In one embodiment, the downhole component is or includes a drilling motor, and the communication system includes a device for controlling one or more parameters of the motor to generate a mechanical movement variation pattern. For example, the drilling motor is a positive displacement motor, commonly referred to as a mud motor, and vibration of the motor is controlled by controlling the flow of fluid through the motor to generate a vibration pattern according to a modulation protocol. A detection device, such as a flow meter (downhole or at the surface) or an accelerometer, detects or estimates the vibration as a function of time, and estimates or identifies the vibration pattern. In some embodiments, the flow meter may be flow meters employed proximate a turbine that is used to measure flow fluctuations. The detected vibration pattern is demodulated or otherwise analyzed to determine the corresponding communication.

Figure 1:
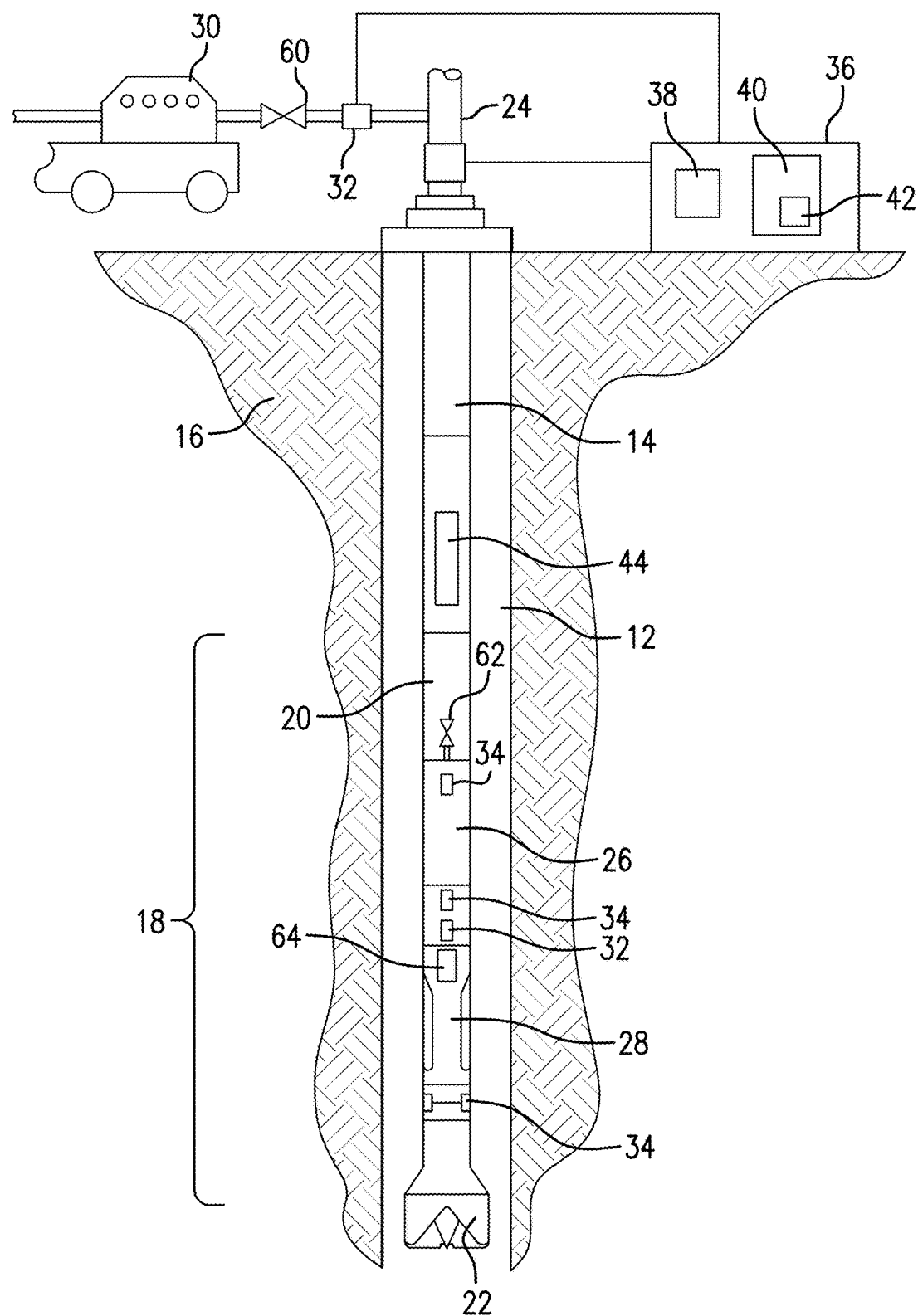
FIG. 1 depicts an exemplary embodiment of a drilling system including a drill string and a drilling assembly disposed in a borehole in an earth formation.

Referring to FIG. 1, an embodiment of a downhole drilling system 10 disposed in a borehole 12 is shown. A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly and/or bottomhole assembly (BHA) 18. Various measurement tools may also be incorporated into the system 10 to affect measurement regimes such as wireline measurement applications or logging-while-drilling (LWD) applications. For example, a LWD tool 20 is incorporated in the drill string 14.

The BHA 18 includes a drill bit 22 that is attached to the bottom end of the drill string 14 via various components, and is configured to be conveyed into the borehole 12 from a drilling rig 24. The drill bit 22 is rotated by a surface drive and/or a downhole drive such as a turbine motor or a mud motor 26. Control of drilling direction can be achieved using a steering unit 28, such as a rotary steering tool. As shown in FIG. 1, the steering unit 28 may be disposed below the mud motor 26. In some non-limiting embodiments, the steering unit 28 may be a rotary steerable device, such as a rotary steerable device utilizing extending blades, e.g. extending blades on a non-rotating sleeve, or a bending device that creates a bend in a component that is connected to the rotor of the mud motor (e.g., a bending device within a drive shaft between the rotor of the mud motor and the drill bit, or a bending device connected within the drill bit). In some embodiments, other tools, such as formation evaluation tools (e.g., tools to measure one or more parameters of the formation surrounding the BHA, such as, without limitation, resistivity tools, nuclear tools, acoustic tools, NMR tools, sampling tools, coring tools, etc.), dynamics measurement tools (e.g., to measure torque, weight-on-bit, etc., at the bit or close to the bit), reamer tools (e.g., underreamer), etc. may be installed below the mud motor 26 (e.g., between the mud motor 26 and the drill bit 22 or within the drill bit 22, for example in the drill bit shaft) that benefit from the downlink method across an unwired mud motor.

For example, in one non-limiting example, a downlink may be sent to one or more of the steering unit, a formation tool, and a reamer tool to either switch on or off the respective tool(s). Further, for example, a downlink may be sent to communicate parameters or commands to one or more downhole tools. The downlink may be sent by modulating a flow velocity of a drilling fluid that creates modulated vibration and rotating patterns of the mud motor. Such rotation and vibration pattern may be detected by sensors, such as sensor 34, and a signal is sent to a processing unit in response to the detected patterns. The processing unit is configured to decode the signal to receive the parameter and/or commands and send the decoded parameters/commands to one or more of the steering unit, the formation tool, and/or the reamer tool to ensure proper operation thereof. In one such example, a steering direction, such as an inclination, an azimuth, or a toolface, etc. may be sent to the steering unit below the mud motor. In another example, a command, such as an on/off switch command, a measurement resolution, a command to store/not to store measurements in a memory, etc. may be sent to a near-bit formation evaluation tool, such as a near-bit gamma or a near-bit resistivity or to a tool with look-ahead capability, such as an acoustic tool or a resistivity tool. In one non-limiting embodiment, a property of the bit, such as a cutter angle and/or a drill bit aggressiveness, may be changed by sending/receiving the parameter or command through the downlink.

In another embodiment, the downlink may be sent to a component above the mud motor. Such component may be connected to a mud pulse telemetry unit via an electrical wire. It will be appreciated that mud pulse telemetry units may operate only above certain flow velocity regimes. As such, if the drilling fluid flow velocity is too low, the mud pulse telemetry unit may not be able to receive downlinks. As an alternative, mud flow variations can be used that create vibration patterns in the mud motor that can be detected by a downhole vibration and/or rotational velocity sensor (also known as a revolutions per minute (rpm) sensor) as discussed.

During drilling, a drilling fluid such as drilling mud is pumped from surface equipment through the drill string 14 using a pumping system, and returns to the surface through the borehole 12. The surface equipment includes, for example, a pressure pump 30 in fluid communication with a fluid tank or other fluid source.

Various sensors or sensing devices may be incorporated into the system 10 at one or more surface and/or downhole locations, to affect measurement regimes such as LWD or measurement-while-drilling (MWD) applications. Exemplary devices include formation evaluation devices such as pulsed neutron tools, gamma ray measurement tools, neutron tools, resistivity tools, acoustic tools, nuclear magnetic resonance tools, density measurement tools, seismic data acquisition tools, acoustic impedance tools, formation pressure testing tools, fluid sampling and analysis tools, coring tools and/or any other type of sensor or device capable of providing information regarding properties of the borehole, downhole components and/or an earth formation. Other examples include pressure sensors, strain sensors, magnetometers, accelerometers, temperature sensors, bending sensors, and others.

In one embodiment, the system 10 includes one or more sensors configured to detect parameters and/or conditions related to vibration of downhole components. Such sensors can be utilized to detect and/or estimate vibrations of downhole components, such as the mud motor 26. Such sensors can be utilized to detect and/or estimate vibrations that are generated by downhole components, such as the mud motor 26. For example, at least one flow rate and/or pressure sensor 32 may be disposed in fluid communication with the pump 30 and the drill string 14 for measurement of fluid flow characteristics. One or more flow rate and/or pressure sensors 32 may be disposed downhole, e.g., at or near the mud motor 26. Other sensors that can be used to detect vibration include, e.g., one or more vibration sensors 34 such as an accelerometer or strain gauges, which can be located at or below the mud motor 26, or at any other suitable location. In some embodiments, the sensors of the system 10 can include rpm sensors, such as an magnetometer, and the downlink can be creased by rpm variations that are caused by flow variations, as known in the art. Such systems may not be able to working within casings (i.e., magnetic environments). However, the combination of detecting the rpm variations caused by flow variation with an rpm sensor, such as a magnetometer, and detecting the vibration variations caused by the flow variations with a vibrations sensor, can increase the reliability and robustness of such a downlink system.

The BHA 18, tool 20, sensors 32 and 34, and/or other components of the string 14 may include or may be communicatively connected to a processor located at a surface location or disposed downhole. For example, the BHA 18 is in communication with a surface processing unit 36 or other processor, such as a surface control unit or a remote unit such as a data center. The surface processing unit 36 is configured to receive, store and/or transmit data and signals, and includes processing components configured to analyze data and/or control operational parameters. In one embodiment, the surface processing unit 36 is configured to control the drilling assembly and receive data from the tool 20 and any other downhole and/or surface sensors. Operational parameters may be controlled or adjusted automatically by the surface processing unit 36 in response to sensor data and other communications (e.g., generated using component vibration as discussed herein), or controlled by a human driller or remote processing device. The surface processing unit 36 includes any number of suitable components, such as processors, memory, communication devices and power sources. For example, the surface processing unit 36 includes a processor 38 (e.g., a microprocessor), and a memory 40 storing software 42. In addition or as an alternative to surface processors, processing capability may be located downhole, for example, as downhole electronics 44, which may perform all or some of the functions described in conjunction with the surface processing unit 36.

The system 10 also includes a communication system configured to generate and transmit communications between a downhole component (e.g., the tool 20) and another device or component such as another downhole component (e.g., the drilling assembly) and/or a surface device such as the surface processing unit 36. The communication system includes one or more communication devices configured to generate a communication by modulating or otherwise controlling vibration of a mud motor or other downhole component(s).

In one embodiment, the communication system controls the frequency or other characteristics of lateral vibrations in the mud motor to generate a communication. The vibrations of the mud motor can then be detected or estimated and analyzed to reproduce the communication. As described herein, a "mud motor" refers to any type of downhole motor having features that rotate due to fluid flowing therethrough. The fluid may be drilling mud or any other type of suitable fluid.

Lateral vibrations in drill strings and bottomhole assemblies are caused by a variety of sources, such as vibrations due to the drill bit, contact between components and the borehole, and rotations of downhole components. One source of vibration is the mass imbalance of the rotor in a mud motor. The excitation frequency of the mud motor (i.e., the frequency of lateral vibration due to rotation of a rotor) is linearly dependent on the rotary speed delivered by the mud motor. Further, the rotary speed is, in a very good approximation, linearly dependent upon the flow rate.

Communication can be performed by controlling operational parameters that can have an effect on movement variations such as lateral vibrations. The movement variations can be any type of variation caused by fluid flow through the mud motor, which can be lateral vibrations and/or other variations such as rotational vibrations and axial vibrations. In one embodiment, communications (e.g., downlinks and/or uplinks) are generated by changing the flow rate of fluid through the mud motor. Changes in the flow rate lead to fluctuations in the mud motor speed and to changes in the instantaneous excitation frequency of the mud motor.

Figure 2:
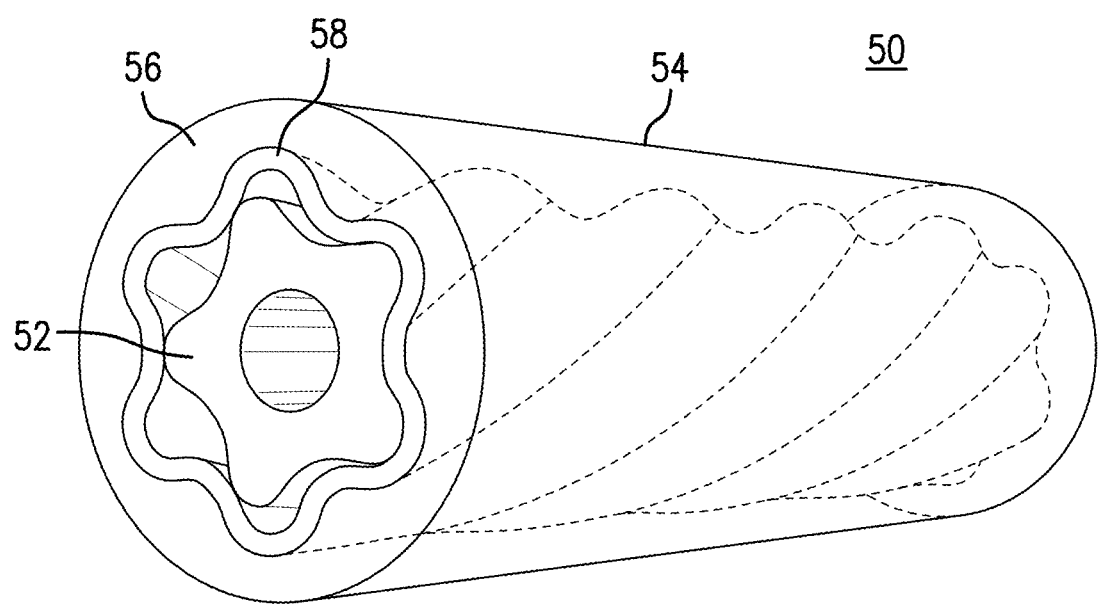
FIG. 2 depicts aspects of a mud motor.

FIG. 2 shows an example of a mud motor 50, and illustrates properties of the mud motor 50 that contribute to vibration or mechanical movement variations. The mud motor 50 in this example can be disposed as part of the system 10 (e.g., as the mud motor 26).

The mud motor 50 includes a rotor 52 and a stator 54. The mud motor 50 is configured to transfer flow energy into rotational energy. This is achieved because the flow of the drilling fluid causes the rotor 52 to rotate relative to the stator 54. The stator 54 may be connected to the drill string above the mud motor and the rotor 52 may be connected to a drive shaft (not shown) below the mud motor which in turn is connected to the drill bit, so as to rotate the drill bit relative to the stator and the drill string caused by the flow of the drilling fluid. As the mud motor connects the rotor and the stator, which are rotating relative to each other, an electrical connection from the stator to the rotor and consequently from the BHA above the mud motor (or the drill string or from the surface) and below the mud motor can be difficult to achieve and prone to errors and failures. A mud motor without an electrical conduit or galvanic contact between the rotor and the stator (i.e., a modular motor) can be more reliable, but may lack the option to provide communication through such an electrical conduit. Consequently, it is highly desired to provide a communication means and method to provide communication from above the mud motor to below the motor without an electrical conduit or galvanic contact between the rotor and the stator. Such communication can enable commands from one or more BHA components above the mud motor or at the surface to a BHA component below the mud motor and/or to the drill bit.

In this example, the stator 54 includes a cylindrical component 56 made from steel or another suitable material, and an elastomer layer 58. The stator 54 forms a number of lobes that interact with lobes on the rotor 52. In this example, the mud motor 50 has a 5/6 lobe configuration (i.e., 5 lobes in the rotor and 6 lobes in the stator). The stator 54 is connected to a drill string and rotates with the drill string, and the rotor 52 is driven by the flow of fluid such as drilling mud that is pumped through the drill string and the mud motor 50. The lobe configuration has an impact on the rotational speed and the torque that can be provided by the mud motor. For a given flow rate and pitch of rotor and stator the motor torque is approximately proportional to the number of lobes. The rotational speed of the rotor 52 changes approximately inversely proportionally with the number of lobes, and thus the rotational speed decreases for a given flow rate as the number of lobes increases.

The rotor 52, when rotating relative to the drill string, becomes a source of lateral and/or torsional vibration that contributes to the overall vibration of a downhole assembly. The lateral vibration due to the rotor 52 has a frequency referred to as an excitation frequency ($f_{exc}$). The excitation frequency $f_{exc}$ depends on the angular velocity of the drill string, the angular velocity of the motor, and the lobe configuration.

In one embodiment, the excitation frequency can be represented by the following: $f_{exc}=z(f_{motor})-f_{string}$ (equation 1), where $f_{motor}$ is the rotational frequency of the rotor and $f_{string}$ is the rotational frequency of a drill string or drilling assembly. It is noted that $f_{string}$ is negative in the above equation because the rotor of a mud motor rotates in a direction that is opposite to the direction of rotation of the mud motor output. In equation 1, z is a constant based on the lobe configuration of the motor. In one embodiment, z is a number corresponding to the number of lobes. For example, the motor 50 of FIG. 2 has five lobes and thus z=5.

As a mud motor is configured to convert energy of fluid flowing therethrough into rotational energy, the fluid flow rate correlates (e.g., may be proportional) to mud motor speed and is linearly dependent on the flow rate. The excitation frequency $f_{exc}$ can be calculated based on a ratio between the fluid flow rate and the corresponding motor speed (referred to as a "speed to flow rate ratio") based on the following dependency: $f_{exc}=z(\text{speed to flow rate ratio})*(\text{flow rate})-f_{string}$ (equation 2).

The communication system, in one embodiment, is configured to perform aspects of a method of communication based on the modulation of a downhole component such as the mud motor. Modulation can be performed using any downhole component or surface component. For communications from a downhole component to another component or to the surface (e.g., an uplink), the downhole component may include or control a motor control device configured to control parameters of the downhole component that are related to vibration or variations in mechanical movement of the component. Likewise, for communications from the surface to a downhole component (e.g., a downlink), a surface component such as the surface processing device includes or is connected to a motor control device at the surface.

In either case, the communication system includes a detection and/or analysis device that detects the vibration or parameters related to the vibration, and demodulates or otherwise analyzes the vibration to determine the communication. The vibration may be detected directly, e.g., by measuring the vibration of a mud motor at or near the mud motor, or measuring vibration at other locations of a drill string. For example, if the detection device is at the surface or other location of a drill string, vibrations that travel along the drill string from the mud motor can be detected. The distribution of the vibration along the drill string can be estimated by calculating or measuring one or more modes with associated mode shape(s) and natural frequency/frequencies or the response of the drill string with respect to the mud motor excitation. The measurement could be performed by using system identification methods such as modal analysis. The model of the drill string could be a mechanical model that includes the stiffness, mass distribution, and damping associated with the drill string. Stiffness, damping, and mass distribution can be calculated using geometry measurements and material properties of the drill string and mud properties. The vibration may be detected or estimated indirectly, e.g., by measuring flow rate and calculating the vibration therefrom. In some embodiments, a flow meter may be employed to measure the flow rate and extract the vibration therefrom, and in some embodiments, the flow meter may be located proximate to or otherwise associated with a turbine that is used to measure flow fluctuations.

Referring again to FIG. 1, examples of motor control devices and detection devices that can be used to perform communications are shown. In this example, the surface processing unit 36 receives flow rate data from the flow rate sensor 32 and controls a surface valve 60 to modulate the flow rate and correspondingly the excitation frequency as a function of time to generate a predetermined mechanical movement variation (e.g., vibration) pattern according to a selected protocol. A downhole component such as the drilling assembly or downhole tool 20 detects the flow rate changes downhole vie, e.g., a flow rate sensor 32 located near the mud motor 26, and calculates the corresponding excitation frequency based on the above equations. Alternatively or in combination with the flow rate, the downhole component can directly measure the excitation frequency via the vibration sensor 34. The downhole component can then demodulate or analyze the excitation frequency pattern to determine the communication.

For communication from a downhole component such as the tool 20, in this example, the downhole component controls a downhole valve 62 device (which may include or be connected to a suitable controller located downhole) to modulate the flow rate and thereby generate a vibration pattern. The vibration pattern can then be estimated at the surface via the surface flow rate sensor 32 and analyzed at the surface, e.g., by the surface processing unit 36.

Figure 3:
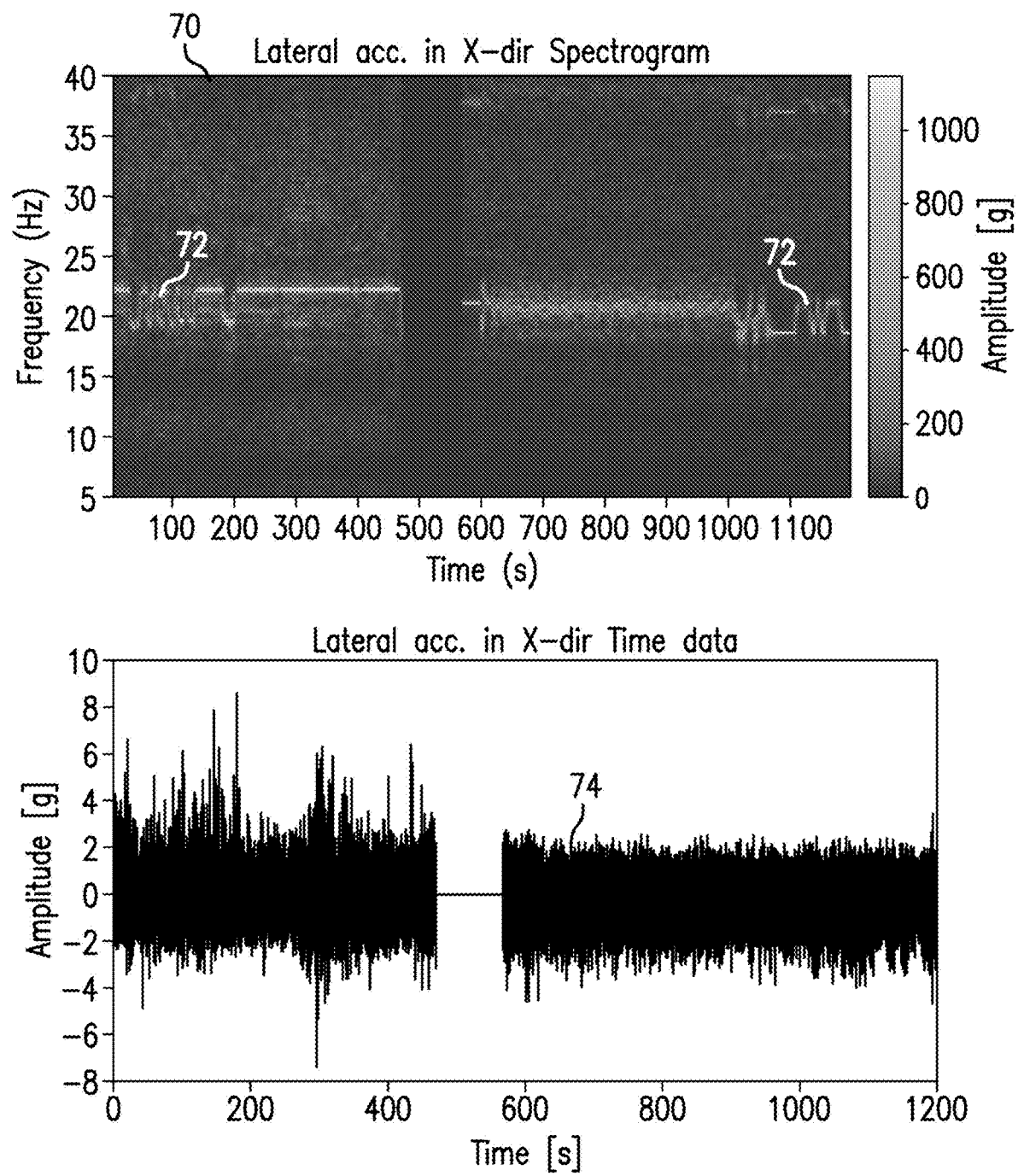
FIG. 3 depicts x-component of a lateral acceleration according to one embodiment, where the upper plot is a spectrogram (frequency over time) of the lower plot which illustrates the lateral acerbation over time.
Figure 4:
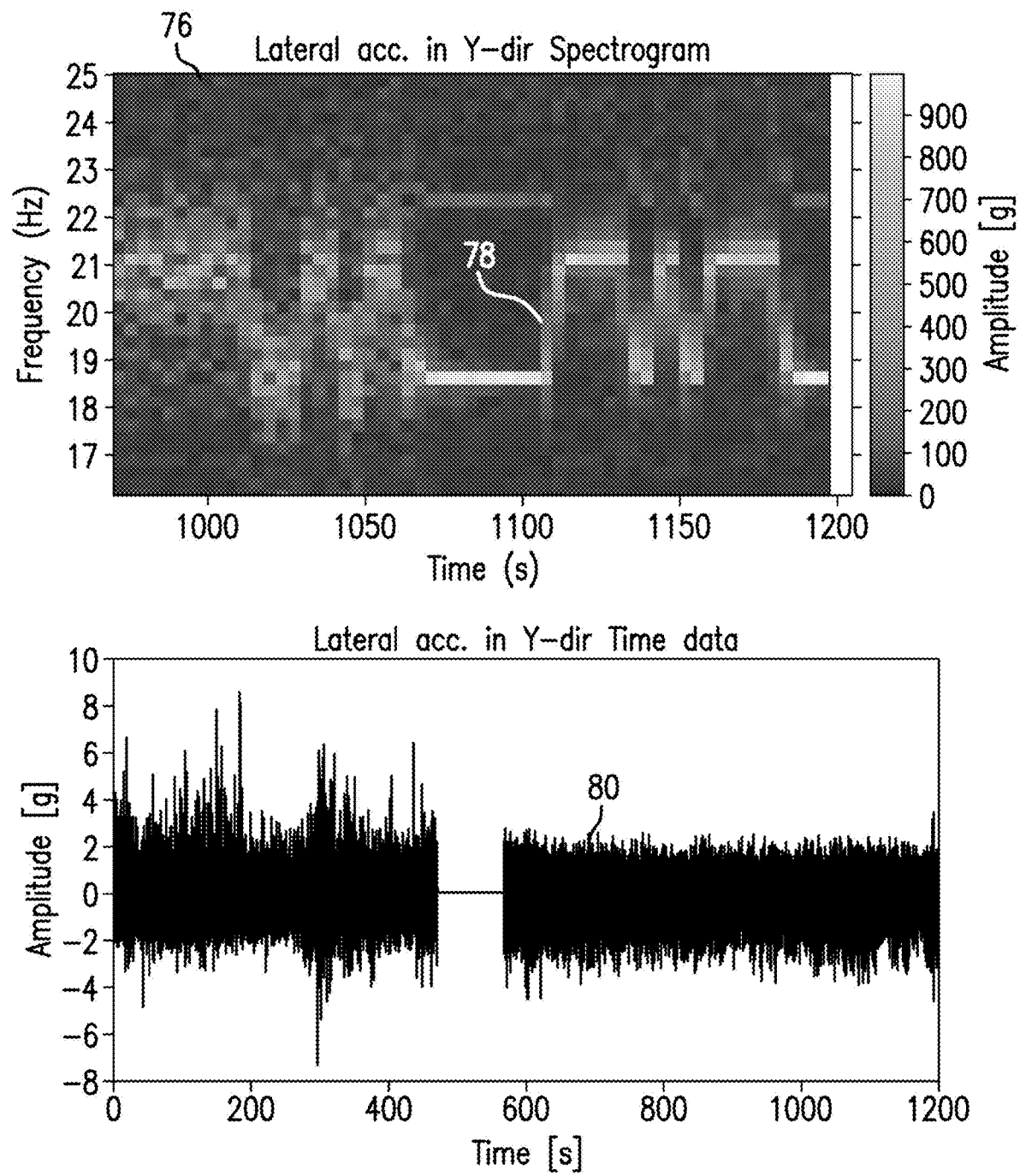
FIG. 4 depicts the y-component of the lateral acceleration of the embodiment of FIG. 3, where the upper plot is a spectrogram (frequency over time) of the lower plot which illustrates the lateral acerbation over time, wherein the upper plot of FIG. 4 is an enlarged illustration over a smaller range of frequency and time.

FIGS. 3 and 4 illustrate an example of modulated lateral vibrations of a mud motor, which can be used as a communication mechanism as discussed herein. FIG. 3 depicts a spectrogram 70 of a modulated excitation frequency signal 72 showing the frequency of lateral vibrations of the mud motor in a first direction (referred to as an x-direction) orthogonal to the longitudinal axis of the mud motor. FIG. 3 also depicts an amplitude signal 74 showing the amplitude of the lateral vibrations in the first direction.

FIG. 4 depicts a spectrogram 76 of a modulated excitation frequency signal 78 showing the frequency of lateral vibrations in a second direction (referred to as a y-direction) orthogonal to the longitudinal axis and to the first direction. FIG. 4 also depicts an amplitude signal 80 showing the amplitude of the lateral vibrations in the second direction.

In this example, the spectrograms 70 and 76 show that the frequency signals form frequency patterns corresponding to changes in the excitation frequency over time. The patterns include a series of pulses generated by varying the frequency between about 18 Hz and 25 Hz. Typical vibration patterns may include an even higher range, such as, but not limited to, 10 Hz-50 Hz or 1 Hz to 100 Hz.

To generate the vibration frequency pattern, the flow rate through the mud motor was adjusted according to the above equation to change the excitation frequency. In this example, the flow through the mud motor was periodically restricted according to a selected protocol by controlling a bypass actuator. The amplitude and excitation frequency was measured by vibration sensors.

In some instances, if mud pulse telemetry is also being used, the signal can be distorted by changes in fluid flow by a mud pulse telemetry system. Those distortions can be removed using appropriate signal processing algorithms. Furthermore, systems and methods as described herein and/or variations thereon can be used to enable communication between downhole components that are not connected by electrical communication connections.

Although the above example discusses modulation of vibration frequency, embodiments described herein are not so limited. Other characteristics of mud motor or other component vibration can be modulated or controlled to perform communication, such as the amplitude of vibrations.

Figure 5:
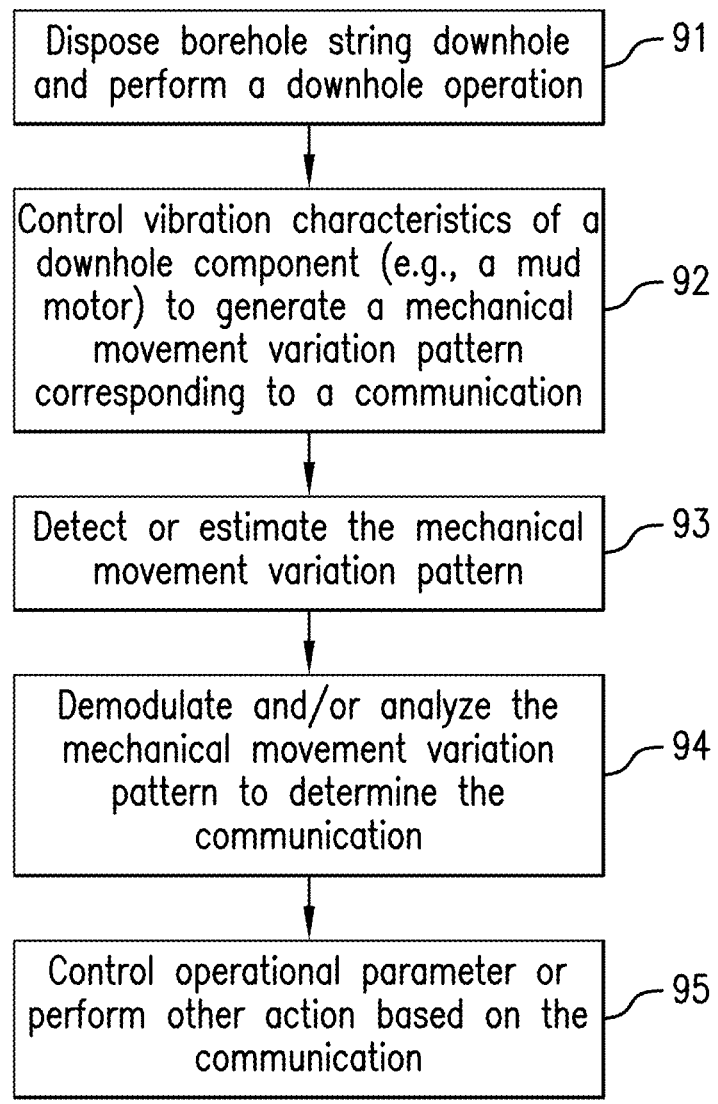
FIG. 5 is a flow chart depicting an embodiment of a method of communicating to and/or from a downhole component.

FIG. 5 illustrates aspects of an embodiment of a method 90 of performing a downhole operation and communicating with a downhole component. The method 90 may be executed by a computer processing system (e.g., the surface processing unit 36 and/or the downhole electronics 44) via suitable programs or software. The method 90 may be performed using components of the system 10 and the communication system included therein, but is not so limited and may be used with any device or system that can control and detect vibrations. The method 90 includes one or more stages 91-95. In one embodiment, the method 90 includes the execution of all of stages 91-95 in the order described. However, certain stages may be omitted, stages may be added, or the order of the stages changed.

In the first stage 91, a borehole string is disposed in a borehole in an earth formation, and an energy industry operation is performed. Examples of such operations include drilling, LWD, MWD, stimulation and production operations. In one embodiment, the operation is a drilling and/or LWD operation that includes disposing a drilling assembly such as the BHA 18 of FIG. 1. The drilling assembly includes a downhole component such as a mud motor, the vibrations of which are controlled as described herein.

In the second stage 92, a surface or downhole device controls the vibration characteristics of a downhole component during the operation to generate a vibration pattern corresponding to a communication (e.g., a command or data). For example, a surface device such as the surface processing unit 36 controls the valve 60 to modulate fluid flow through the mud motor 26 and generate a vibration pattern such as an excitation frequency pattern. The fluid flow as a function of time needed to generate a selected pattern may be calculated using equation (2) discussed above.

The pattern may be generated based on a suitable communication protocol. For example, the vibration can be modulated using frequency shift keying ("FSK") to generate a frequency pattern including square pulses in the frequency domain formed by an increase or decrease of the excitation frequency.

In the third stage 93, a detection device detects or estimates the vibration pattern using any suitable measurement and/or analysis technique. For example, a downhole component, such as the tool 20 or a downhole detection and processing module 64 connected to the valve device 62 and/or one or more sensors, detects the fluid flow rate through the mud motor 26 as a function of time, and calculates the corresponding frequency pattern using equation (2). In another example, the downhole component directly measured the vibration using, e.g., the vibration sensor 34.

In the fourth stage 94, the detection device or other suitable device (e.g., the downhole electronics 44) demodulates or otherwise analyzes the vibration to determine the communication.

In the fifth stage 95, an operational parameter of the operation is adjusted or one or more other actions are performed based on the communication. For example, if the communication includes measurement data from a downhole tool or sensor, the surface processing unit 36 or other processor may adjust operational parameters such as drilling direction, weight-on-bit, drill bit rotational rate and others. If the communication is a command from a processor or controller, an appropriate device is actuated according to the command. Other actions may include stopping or adjusting operational parameters in response to a communication that includes a warning, alarm or other indication of a malfunction or suboptimal condition.

It is noted that, although the method 90 is discussed in the context of a downlink or other communication from a surface device to a downhole component, the method may also be performed to communicate from a downhole component to another downhole component and/or the surface. In addition, although embodiments are described in the context of mud motors, they are not so limited, as communications can be affected using any suitable downhole component that exhibits vibrations.

The systems and methods described herein provide various advantages over prior art techniques. The embodiments described herein provide a communication mechanism that can be used as an alternative to, or in addition to, other telemetry regimes. For example, communication via component vibration can be used to communicate with downhole components or between downhole components (e.g., to trigger sensor measurements that may not be connected to wired pipe or other communication systems). One example of such a downhole component is a measurement device (e.g., for measuring bit speed, weight-on-bit, vibrations etc.) below the mud motor. The embodiments provide an alternative communication channel, e.g., to tools that are powered by a battery sub and/or an energy harvesting sub and are not connected to mud pulse telemetry or other communication regimes.

Generally, some of the teachings herein are reduced to an algorithm that is stored on machine-readable media. The algorithm is implemented by the computer processing system and provides operators with desired output.

Embodiment 1

A communication method for communicating from a surface location to a downhole component in a borehole in an earth formation, the method comprising: modulating, by a first device at the surface location, a fluid flow through a mud motor according to a predetermined pattern, the mud motor disposed in the borehole, the modulated fluid flow generating a mechanical movement variation pattern of at least a part of the mud motor; detecting, by a second device in the downhole component, the mechanical movement variation pattern; and demodulating the mechanical movement variation pattern to receive a signal that is related to the predetermined pattern.

Embodiment 2

A communication method according to the preceding embodiment, wherein the mechanical movement variation pattern is a vibration pattern.

Embodiment 3

A communication method according to the preceding embodiment, wherein a frequency of the vibration pattern is a function of a velocity of the fluid flow.

Embodiment 4

A communication method according to the preceding embodiment, wherein the vibration pattern is a pattern of a frequency of a vibration as a function of time.

Embodiment 5

A communication method according to the preceding embodiment, wherein the frequency is an excitation frequency of a rotor in the mud motor.

Embodiment 6

A communication method according to any preceding embodiment, wherein the mechanical movement variation pattern is a pattern of lateral vibration caused by a mass imbalance in the mud motor during rotation of the mud motor.

Embodiment 7

A communication method according to any preceding embodiment, wherein the signal is used to send at least one of a parameter and a command to the downhole component.

Embodiment 8

A communication method according to any preceding embodiment, wherein the mechanism movement variation pattern comprises a rotation and a lateral vibration, and the second device comprises an rpm sensor and a vibration sensor.

Embodiment 9

A communication method according to any preceding embodiment, wherein the signal is used to operate at least one of a steering tool, a formation evaluation tool, a reamer, a dynamics measurement tool, and a drill bit.

Embodiment 10

A communication method according to the preceding embodiment, wherein the second device is disposed below the mud motor.

Embodiment 11

A communication system configured to communication from a surface location to a downhole component in a borehole in an earth formation, the communication system comprising: a modulation device, located at the surface location, configured to modulate a fluid flow through a mud motor according to a predetermined pattern, the mud motor disposed in the borehole, the modulated fluid flow generating a mechanical movement variation pattern of at least a part of the mud motor; and a detection device, located in the downhole component, configured to detect the mechanical movement variation pattern to receive a signal that is related to the predetermined pattern.

Embodiment 12

A system according to the preceding embodiment, wherein the mechanical movement variation pattern is a vibration pattern.

Embodiment 13

A system according to the preceding embodiment, wherein a frequency of the vibration pattern is a function of a velocity of the fluid flow.

Embodiment 14

A system according to a preceding embodiment, wherein the vibration pattern is a pattern of a frequency of the vibration as a function of time.

Embodiment 15

A system according to the preceding embodiment, wherein the frequency is an excitation frequency of a rotor in the mud motor.

Embodiment 16

A system according to any preceding embodiment, wherein the mechanical movement variation pattern is a pattern of lateral vibration caused by a mass imbalance in the mud motor during rotation of the mud motor.

Embodiment 17

A system according to any preceding embodiment, wherein the signal is used to send at least one of a parameter and a command to the downhole component.

Embodiment 18

A system according to any preceding embodiment, wherein the mechanical movement variation pattern comprises a rotation and a lateral vibration, and the detection device comprises an rpm sensor and a vibration sensor.

Embodiment 19

A system according to any preceding embodiment, wherein the signal is used to operate at least one of a steering tool, a formation evaluation tool, a reamer, a dynamics measurement tool, and a drill bit.

Embodiment 20

A system according to any preceding embodiment, wherein the modulation device and the detection device are disposed below the mud motor.

In support of the teachings herein, various analysis components may be used, including digital and/or analog systems. The digital and/or analog systems may be included, for example, in the downhole electronics unit 44 or the processing unit 36. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply, an energy harvesting device, and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A communication method for communicating from a surface location to a downhole component in a borehole in an earth formation, the method comprising:
modulating, by a first device at the surface location, a fluid flow through a mud motor according to a predetermined pattern, the mud motor disposed in the borehole, the modulated fluid flow generating a mechanical movement variation pattern of at least a part of the mud motor;

detecting, by a second device in the downhole component, the mechanical movement variation pattern; and demodulating the mechanical movement variation pattern to receive a signal that is related to the predetermined pattern.

2. The communication method of claim 1, wherein the mechanical movement variation pattern is a vibration pattern.

3. The communication method of claim 2, wherein a frequency of the vibration pattern is a function of a velocity of the fluid flow.

4. The communication method of claim 2, wherein the vibration pattern is a pattern of a frequency of a vibration as a function of time.

5. The communication method of claim 4, wherein the frequency is an excitation frequency of a rotor in the mud motor.

6. The communication method of claim 1, wherein the mechanical movement variation pattern is a pattern of lateral vibration caused by a mass imbalance in the mud motor during rotation of the mud motor.

7. The communication method of claim 1, wherein the signal is used to send at least one of a parameter and a command to the downhole component.

8. The communication method of claim 1, wherein the mechanical movement variation pattern comprises a rotation and a lateral vibration, and the second device comprises an rpm sensor and a vibration sensor.

9. The communication method of claim 1, wherein the signal is used to operate at least one of a steering tool, a formation evaluation tool, a reamer, a dynamics measurement tool, and a drill bit.

10. The communication method of claim 9, wherein the second device is disposed below the mud motor.

11. A communication system configured to communication from a surface location to a downhole component in a borehole in an earth formation, the communication system comprising:

a modulation device, located at the surface location, configured to modulate a fluid flow through a mud motor according to a predetermined pattern, the mud motor disposed in the borehole, the modulated fluid flow generating a mechanical movement variation pattern of at least a part of the mud motor; and a detection device, located in the downhole component, configured to detect the mechanical movement variation pattern to receive a signal that is related to the predetermined pattern.

12. The system of claim 11, wherein the mechanical movement variation pattern is a vibration pattern.

13. The system of claim 12, wherein a frequency of the vibration pattern is a function of a velocity of the fluid flow.

14. The system of claim 12, wherein the vibration pattern is a pattern of a frequency of the vibration as a function of time.

15. The system of claim 14, wherein the frequency is an excitation frequency of a rotor in the mud motor.

16. The system of claim 11, wherein the mechanical movement variation pattern is a pattern of lateral vibration caused by a mass imbalance in the mud motor during rotation of the mud motor.

17. The system of claim 11, wherein the signal is used to send at least one of a parameter and a command to the downhole component.

18. The system of claim 11, wherein the mechanical movement variation pattern comprises a rotation and a lateral vibration, and the detection device comprises an rpm sensor and a vibration sensor.

19. The system of claim 11, wherein the signal is used to operate at least one of a steering tool, a formation evaluation tool, a reamer, a dynamics measurement tool, and a drill bit.

20. The system of claim 11, wherein the detection device is disposed below the mud motor.

* * * * *